Patented May 1, 1934

1,956,961

UNITED STATES PATENT OFFICE 1,956,961

TREATED PAPER AND PROCESS OF PRODUCING THE SAME

James Reid, New York, N. Y.

No Drawing. Application February 28, 1931,
Serial No. 519,284. Renewed September 20,
1933

4 Claims. (Cl. 91—70)

Tung oil, or China-wood oil, is an unsaturated glyceride, and ordinarily is included in the general grouping of drying oils. However, this oil is in certain particulars quite distinct from other drying oils such as linseed oil, for example, in that its hardening can be made to take place almost entirely as a polymerization, accompanied with a minimum of oxidation, and with a substantial freedom from the evolution during drying of acid products of oxidation. Thus, if this oil is heated to temperatures in the order of 540° F. or higher, and no retarding means is used, the entire mass will quite quickly harden in the pot. However, by the use of retarding means known in the art, such as the introduction of substances such as sulphur or selenium or hydroquinone, the polymerization will be so retarded that temperatures as high as 620° F. can be reached. Even if these high temperatures are not reached, but the oil is heated to a temperature as high as 365° F., polymerization will be initiated and will thereafter continue, though somewhat slowly, at temperatures within the normal atmospheric range, particularly if dryers are added which probably have a catalytic effect to induce polymerization.

I have found that if a relatively small amount of tung oil in which polymerization has thus been initiated, is incorporated with ordinary paper, the strength of this paper is tremendously increased. This effect is not immediate, but becomes apparent after substantially complete polymerization has taken place, which may be anywhere from 2 to 21 days, depending on the nature of the heat treatment of the oil and the dryers used, and the temperature at which the paper is stored.

Apparently the fibers become more or less coated with the oil which upon hardening serves as an exceedingly strong bonding agent between the fibers but is so flexible that it does not cause the fibers to crack and does not reduce the flexing strength of the paper. Further, since this oil is waterproof, there is no loss of strength if the paper is moistened. Unless large quantities of the oil are used, or unless the oil has been brought to a very viscous state, the paper sheet will not be waterproofed by the impregnation, as it will still remain porous, but as stated, the fibers and the bonds between the fibers will be waterproofed so that water will not tend to loosen and separate them. In other words the paper is given a new and very valuable type of sizing.

In carrying out the process, the oil may, for example, be heated for a half hour at 370° F. and then allowed to cool somewhat, say to about 355° F. after which siccatives or dryers are added. These are of the usual type such as the cobalt acetate or other cobalt dryers, lead acetate, litharge, stannic chloride and the like. Ordinarily about 1% to 2½% of dryer will be used, though this may be materially modified. If higher temperatures are used, the time of treatment of the oil need not be so long, thus at about 425° F., a ten-minute treatment of the oil will ordinarily be sufficient. As stated, if temperatures in the order of 540° F. or higher are to be used, the polymerization should be retarded, after which the temperature may be carried up above 600° F. In each case it is advisable that the oils be cooled down to somewhere between 350° F. and 370° F. before the dryers are added. The nature of the product will depend somewhat upon the temperature to which the oil has been heated, for as the temperature goes up, the oil becomes more and more viscous, with a tendency to form a continuous film on the paper if the higher temperatures have been used. At the same time there is apparently somewhat less permeation and therefore the increase in toughness of the paper is not so great, though in any case this increase is appreciable.

The oil may be applied to the finished paper in any desired way as by spraying, or the use of a transfer roll. I find that the latter expedient is the simplest and ordinarily will use from 1½ to about 8% of oil based on the weight of the paper to get the sizing effect, or increased strength, though for waterproofing I may use up to 35%.

If desired, rosin may be fluxed with the oil while the latter is being heated. Up to about 25% or more has apparently little or no effect on the result and serves as a distender of the oil, reducing the cost of the treatment. I have also found that if a porous paper is to be produced, permeation of the fibers can be increased by heating the paper after impregnation, as by passing it over a roll heated to from 200° to 500° F.

The following is a specific example of my operation:

A quantity of China-wood oil was heated to 370° F. with about 25% of rosin. The mixture was heated at this temperature for one-half hour. It was then cooled to 355° F. and 2% of cobalt acetate added. On cooling, the product was a heavy oil having a viscosity about similar to that of maple syrup. This oil was applied to one face of a roll of paper by means of a transfer roll which dipped into the oil and contacted with the face of the paper after which excess was scraped off. Between 2 and 6% of oil based on the weight of the paper was thus incorporated and after impregnation the paper was passed over a roll heated to about 350° F. An immediate examination of the paper showed a slight loss in strength accompanied by a permeation of the paper by the oil. The paper was wound up in the usual roll and put away for about two weeks. On again being examined, it was found that the paper was permeable to water and had lost none of its flexibility, but its strength had been increased by more than 50% when subjected to the Mullen test—that is, a test to find the pounds pressure per square inch which the paper would withstand. The tensile strength of the paper was likewise increased proportionately. Upon wetting the paper, it was found that instead of losing strength, as is usual, the wet strength was actually slightly greater than that of the dry treated product.

It is understood that this example is given only by way of illustration and that the details may be modified in many particulars without departing from the spirit of my invention.

What I claim is:

1. The process of treating paper to increase the strength thereof without rendering the same impermeable to water, which comprises impregnating the paper with from 1½% to 8% of tung oil which has been heat treated at a temperature above 355° F. but maintained in a liquid state and permitting such oil to polymerize while absorbed by the paper.

2. The process of treating paper to increase the strength thereof which comprises heating tung oil above 355° F. to initiate polymerization, adding a dryer, incorporating in excess of 1½% of such oil in paper, heating the paper to assist in permeation, and permitting the oil to continue its polymerization while in the paper.

3. As a new product, a sheet of paper characterized by the fact that it is permeable by water and is of great strength both wet and dry, which comprises between 1½% and 8% of polymerized tung oil distributed through the sheet.

4. The process of treating paper to increase the strength thereof, which comprises heating tung oil above 355° F. to initiate polymerization, incorporating at least about 1½% of such oil while in the liquid state in the paper, and permitting the oil to continue its polymerization while in the paper.

JAMES REID.